Figure 3:
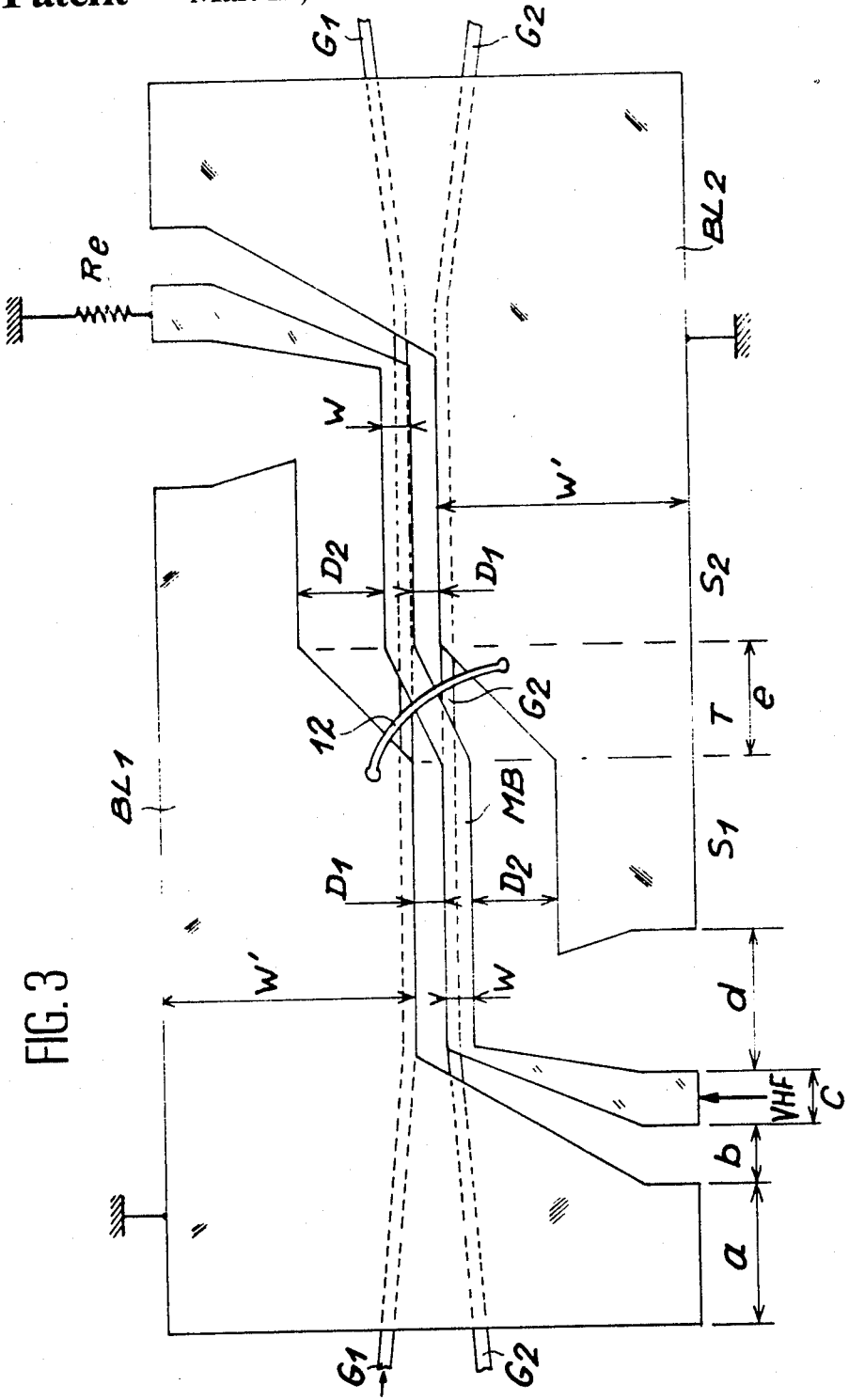

United States Patent [19]

Sabatier et al.

[11] Patent Number: 4,732,445
[45] Date of Patent: Mar. 22, 1988

[54] ELECTROOPTICAL DIRECTIONAL COUPLER WITH TRAVELING WAVE AND ALTERNATING PHASE SHIFT

[75] Inventors: Christian Sabatier, Nice; Alain Carenco, Bourg La Reine, both of France

[73] Assignee: Centre National d'Etudes des Telecommunications, Issy Les Moulineaux, France

[21] Appl. No.: 3,935

[22] Filed: Jan. 16, 1987

[30] Foreign Application Priority Data

Jan. 16, 1986 [FR] France .................. 86 00561

[51] Int. Cl.$^4$ ............................. G02B 6/10
[52] U.S. Cl. ..................... 350/96.14; 350/96.13
[58] Field of Search ............... 350/96.12, 96.13, 96.14, 350/96.15

[56] References Cited

U.S. PATENT DOCUMENTS 4,652,078  3/1987  Baratle et al. ............... 350/96.13 X

FOREIGN PATENT DOCUMENTS 0125182  11/1984  European Pat. Off. .

OTHER PUBLICATIONS

Applied Physics Letters, vol. 45, No. 11, Dec. 1984, pp. 1168-1170, American Institute of Physics, New York, U.S., R. A. Becker: "Traveling-Wave Electro-Optic Modulator with Maximum Bandwidth-Length Product".

Applied Physics Letters, vol. 28, No. 9, May, 1976, pp. 503-506, American Institute of Physics, New York, U.S.; R. V. Schmidt et al.: "Electro-Optically Switched Coupler with Stepped $\Delta\beta$ Reversal Using Ti-Diffused LiNbO$_3$ Waveguides".

Primary Examiner—Eugene R. LaRoche
Assistant Examiner—James C. Lee
Attorney, Agent, or Firm—Oblon, Fisher, Spivak, McClelland & Maier

[57] ABSTRACT

Electrooptical directional coupler with traveling wave and alternating phase shift. This coupler comprises a central electrode in the form of microstrip (MB) of width W and two lateral electrodes (BL1, BL2) very wide in comparison with W. The propagation line then is asymmetrical.

1 Claim, 4 Drawing Figures

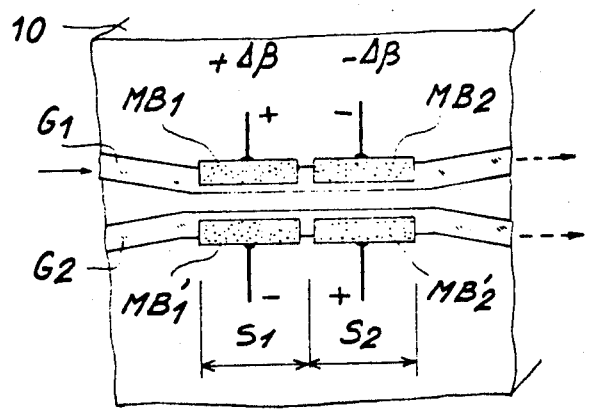
FIG. 1
FIG. 2
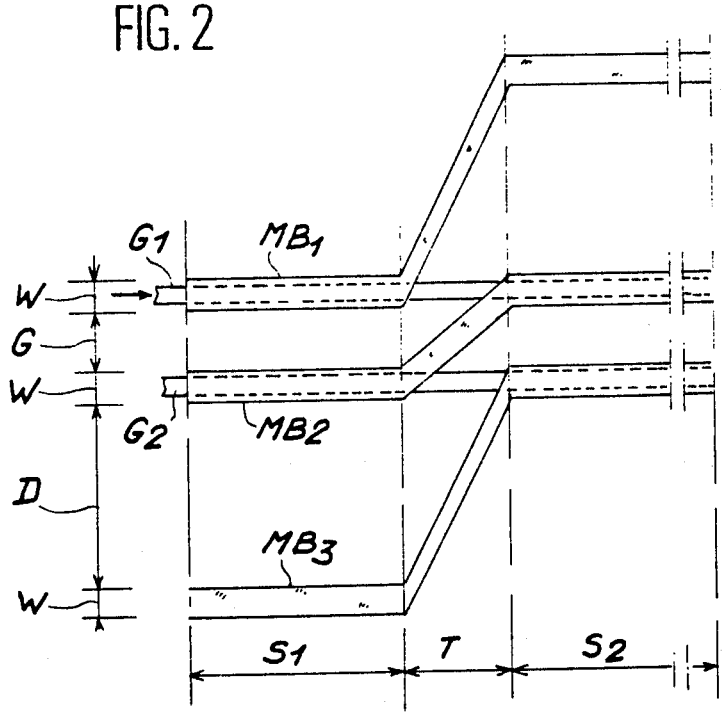

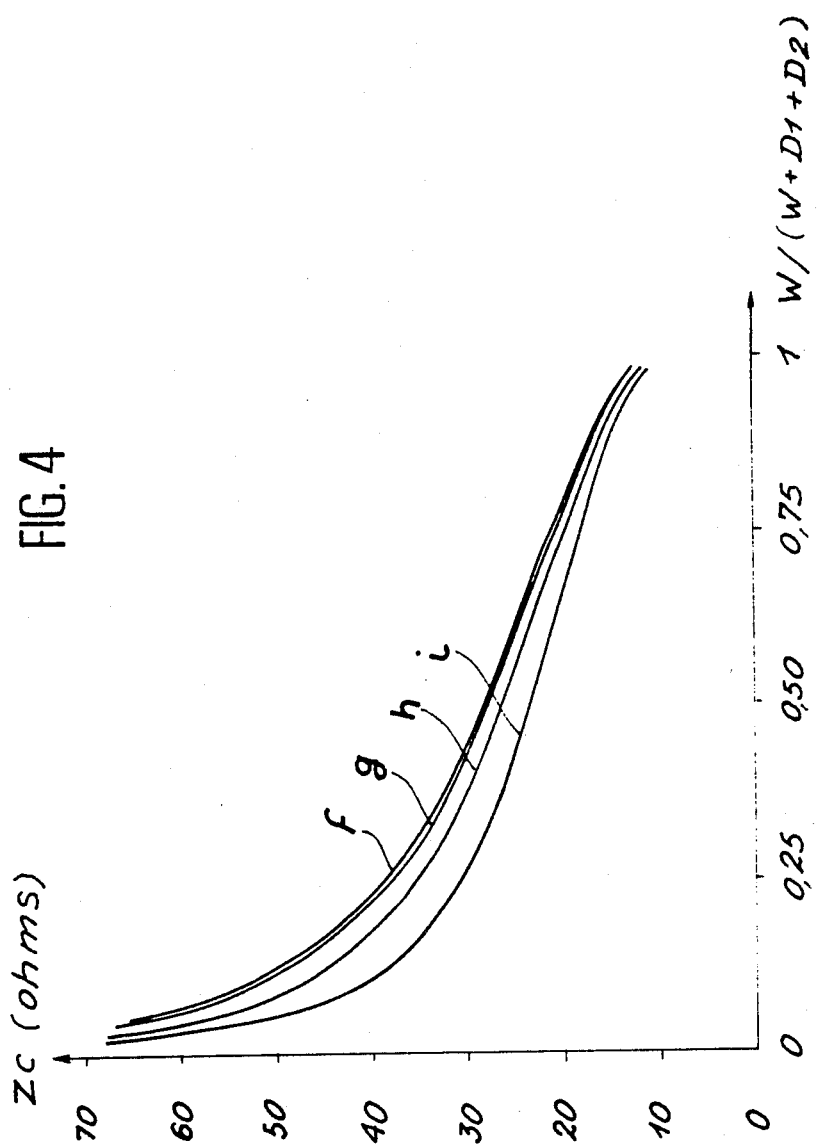

ELECTROOPTICAL DIRECTIONAL COUPLER WITH TRAVELING WAVE AND ALTERNATING PHASE SHIFT

This invention has as it object an electrooptical directional coupler with traveling wave and alternating phase shift. It finds an application in integrated optics.

An electrooptical directional coupler with alternating phase shift according to the prior art is shown in FIG. 1. A substrate 10 comprises a light propagation structure consisting of a first optical guide G1 and a second optical guide G2. A set of electrodes comprises microstrips MB1 and MB'1 in a first section S1 and MB2, MB'2 in a second section S2. These strips cover the optical guides and are connected to voltage sources not shown. The light goes through guide G1 and comes out through one and/or the other of guides G1 and G2 depending on the voltages applied. A phase shift $\Delta\beta$ appears in each section and, because of the alternation of the electric connections, this phase shift is alternating, i.e., it takes the value $+\Delta\beta$ in the first section and $-\Delta\beta$ in the second.

Such a structure is described, for example, in the article by H. Kogelink and R. V. Schmidt, titled "Switched Directional Couplers with Alternating $\Delta\beta$," published in the journal IEEE Journal of Quantum Electronics, vol. QE-12, No. 7, July 1976, pages 396–401.

The functioning of such a device, in the case where the electrooptical material is $LiNbO_3Ti$ and the luminous radiation is 1.06 $\mu$m is described by P. Thioulouse, A. Carenco and R. Guglielmi in an article titled "High-Speed Modulation of an electrooptic Directional Coupler," published in "IEEE Journal of Quantum Electronics," vol. QE-17, No. 4, April 1981, pages 535–541.

Although such devices are satisfactory, they still run into a difficulty when an effort is made to increase the width of the light modulation strip. The response time of the circuit is actually limited by the value of the localized constants of the electrodes and their adaptation elements.

To avoid this difficulty, it has been proposed to use, as electrode structure, microstrips forming a propagation line for the electric supply wave. Then a traveling wave structure is obtained in which the electrooptical interaction is maintained from one end of the guides to the other. The ultimate limitation comes from the difference in propagation speed of the optical wave and the electric wave in the material considered.

In French patent application FR-A 2545947, a structure is described which is with both alternating phase shift an traveling wave. This structure is shown in FIG. 2. It comprises three conductive strips, a central strip MB2 framed by a first and a second lateral strip MB1, MB3. The coupler comprises at least two sections S1 and S2 separated by a transition zone T. In first section S1, central strip MB2 covers second optical guide G2, first lateral strip MB1 covers first optical guide G1 and second lateral strip MB3 is very distant from the central strip. In second section S2 the situation is symmetrical: the central strip covers guide G1, first lateral strip MB1 is very distant, and second lateral strip MB3 covers guide G2.

In transition zone T which maintains the impedance matching, the central strip is inclined in relation to the direction of the optical guides and progressively goes from the second to the first guide. The lateral strips also progressively go from one position to the other: first lateral strip MB1 which covered first guide G1 in first section S1 moves away from the latter and then remains very far from the central strip in second section S2, while second lateral strip MB3, which was very far from the central strip in first section S1 comes close to the latter and comes to cover second optical guide G2 in second section S2.

The three strips have a width W and the distance between the central strip and lateral strips is equal either to G or D, D being much greater than G. This latter condition causes the lateral strip distant from D practically not to participate in the propagation line of the electric wave, this line consisting essentially of the central strip and that of the two lateral strips which is closest. In the patent application cited, this line of propagation therefore is symmetrical since the two strips constituting it have the same width. The values W, G and D are, moreover, selected so that the characteristic impedance of the line is matched with the generator delivering the electric wave. In practice, this impedance is often 50 $\Omega$.

This invention has as its object a device of this type but which specifies the use of an asymmetrical and no longer symmetrical electrode structure. Several advantages result including less sensitivity to the box in which the coupler is housed and a better transition with the coaxial supply cable. This is reflected by an electric passband less disturbed than with the prior device.

More precisely, the invention specifies giving the lateral strips a very great width in comparison with the width of the central strip.

In any case, the characteristics of the invention will appear better in the light of the following description of an example of embodiment given by way of illustration, in no way limiting.

This description refers to the accompanying drawings in which:

FIG. 1, already described, represents an alternating phase shift coupler according to the prior art, FIG. 2, already described, represents a coupler with traveling wav and alternating phase shift according to the prior art, FIG. 3 represents a coupler according to the invention, FIG. 4 is a graph making it possible to define the various parameters of the line as a function of the desired characteristic impedance.

In FIG. 3 is seen a coupler according to the invention. This coupler comprises two optical guides G1 and G2 and three electrodes, namely, a central microstrip MB, a first lateral strip BL1 and a second lateral strip BL2. In the interaction zone the lateral strips have a width W' much greater than width W of the central microstrip. Moreover, this latter is distant from the lateral strips by D1 and D2, respectively. The coupler represented comprises, in the example shown, two sections S1 and S2 and a transition T. But, of course, it is possible to make a coupler with more than two sections (for example, 3 or 4, . . . ).

In the embodiment shown, the central microstrip is bent at each of its ends, respectively upward and downward, to facilitate connection with the supply generator and the matched load Re, by disengaging the inputs and outputs of optical guides G1 and G2.

In case $LiNbO_3$ is used as electrooptical material, it will be possible to choose, for example: W=10 $\mu$m, D1=17 $\mu$m and D2=200 $\mu$m, which corresponds to a characteristic impedance of 50 Ω. Width W' can be on the order of a millimeter or more, i.e., more than 100 times width W. Moreover, the lengths marked by a to e can have the following values (in μm):

a=1700
b=170
c=100
d=2000
e=100

In case a thin layer of $SiO_2$ with a thickness of 0.3 μm is inserted between the crystal and the metal conductors, there will be selected: w=10 μm, D1=5 μm and D2=200 μm, always to have a characteristic impedance of 50 Ω. In this case, b will be given the value 100 μm and c the value of 200 μm.

FIG. 4 gives a means for finding the various parameters W, D1 and D2 for a given characteristic impedance Zc. Curves f, g, h and i correspond to a D1/D2 ratio equal respectively to 1/0.5/0.25/0.1. The ratio W/(W+D1+D2) is plotted on the abscissas and the characteristic impedance expressed in ohms on the ordinates.

As in the prior art, central microstrip MB should be connected to the central conductor of the coaxial supply cable, while the two lateral electrodes are connected to the outside conductor, i.e., in practice, to the ground. Strips BL1 and BL2 then constitute ground planes. They are connected together by the metal box of the device.

Spurious resonances caused by the coupling of the radiating modes of the propagation line are eliminated by putting conductive connections between the two ground planes BL1 and BL2. In practice, this connection, referenced 12 in FIG. 3, is a gold wire about fifty microns in diameter, attached to the electrodes.

The process of making the coupler of the invention can be identical with that described in the patent application cited above.

We claim:

1. Electrooptical directional coupler with traveling wave and alternating phase shift of the type of those which comprise a light propagation structure consisting of a substrate containing a first optical guide (G1) and a second optical guide (G2), this structure being covered by a set of electrodes comprising three conductive strips deposited on the substrate, a central strip (MB) framed by a first and second lateral strip (BL1, BL2), this coupler comprising at least two sections (S1, S2) separated by a transition zone (T), a first section (S1) in which central strip (MB) covers second optical guide (G2), first lateral strip (BL1) covers first optical guide (G1) and second lateral strip (BL2) is very far from the central strip, and a second section (S2) in which central strip (MB) covers first optical guide (G1), second lateral strip (BL2) covers second optical guide (G2), and first lateral strip (BL1) is very far from central strip (MB), and a transition zone (T) in which central strip (MB) is inclined in relation to the direction of optical guides (G1 and G2) and goes progressively from the second to the first guide in which the edges of the lateral strips are also inclined so that first lateral strip (BL1), which covered first optical guide (G1) in first section (S1) moves away from the latter and then remains very far from central strip (MB) in a second section (S2), while the second lateral strip, which was very far from central strip (MB) in first section (S1) comes close to the latter and comes to cover second optical guide (G2) in second section (S2), the central strip having, in the two sections, a width (W) and being far away from first lateral strip (BL1) by an interval D1 and from second lateral strip (BL2) by an interval D2, in the first section, and respectively separated by intervals D2 and D1 in the second section, the amounts of W, D1 and D2 being selected so that the characteristic impedance of the propagation line formed by these electrodes is equal to a given matching value, this matching being maintained in transition T, this coupler being characterized by the fact that first and second strips (BL1, BL2) have a very great width (W') in comparison with the width (W) of the central strip and are connected together by a conductive element, the propagation line, which is formed essentially by the central strip and that of the two lateral strips which is closest, thus being asymmetrical.

* * * * *